US009637199B2

(12) United States Patent
Pasqua et al.

(10) Patent No.: US 9,637,199 B2
(45) Date of Patent: May 2, 2017

(54) BICYCLE GEARSHIFT WITH IMPROVED PRECISION CONTROL

(71) Applicant: Campagnolo S.r.l., Vicenza (IT)

(72) Inventors: Paolo Pasqua, Camisano Vicentino (IT); Leopoldo Lazzarin, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 14/186,233

(22) Filed: Feb. 21, 2014

(65) Prior Publication Data

US 2014/0243129 A1      Aug. 28, 2014

(30) Foreign Application Priority Data

Feb. 22, 2013   (IT) .............................. MI2013A0252

(51) Int. Cl.
*F16H 9/00*      (2006.01)
*F16H 59/00*     (2006.01)
(Continued)

(52) U.S. Cl.
CPC .......... *B62M 9/126* (2013.01); *B62M 9/1242* (2013.01); *B62M 9/1248* (2013.01)

(58) Field of Classification Search
CPC .. B62M 9/1244; B62M 9/1248; B62M 9/126; B62M 9/122; B62M 25/08
(Continued)

(56) References Cited

U.S. PATENT DOCUMENTS 3,742,777 A * 7/1973 Mathauser ...................... 474/81
3,927,904 A * 12/1975 Bergles .......................... 280/236
(Continued)

FOREIGN PATENT DOCUMENTS

| EP | 0850829 A2 | 7/1998 |
| EP | 1357023 A1 | 10/2003 |
| GB | 819476 A | 9/1959 |

OTHER PUBLICATIONS

Italian Search Report and Written Opinion in Italian Application No. IT MI2013A000252, Nov. 22, 2013 with English translation.

*Primary Examiner* — Henry Liu
(74) *Attorney, Agent, or Firm* — Volpe and Koenig, P.C.

(57) ABSTRACT

The present invention refers to a bicycle gearshift with improved precision control, which comprises a kinematic mechanism in the form of a four-bar linkage with a base body and a mobile body connected together through a pair of connecting rods articulated to the base body and to the mobile body at four pin elements, each pair of opposite pin elements of the four pin elements defining a diagonal of the four-bar linkage-kinematic mechanism, the base body comprising a first attachment group to a bicycle frame and the mobile body being connected to a chain guide at a second attachment group, the four-bar linkage-kinematic mechanism being associated with gearshift actuation means suitable for deforming the four-bar linkage-kinematic mechanism so as to determine a displacement of the mobile body with respect to said base body and consequently a primary displacement of the chain guide in the axial direction with respect to the axis (A) of a cogset, at least one from the first attachment group and the second attachment group comprising a chain tensioning spring, the chain tensioning spring determining a set-up of the chain guide when engaged with a chain of a bicycle transmission, and it is characterized in that it comprises a kinematic mechanism for adjusting the preload of the chain tensioning spring as a function of the primary displacement of the chain guide so as to determine a variation in the set-up of the chain guide.

16 Claims, 11 Drawing Sheets

(51) Int. Cl.
   *F16H 61/00*  (2006.01)
   *F16H 63/00*  (2006.01)
   *B62M 9/126*  (2010.01)
   *B62M 9/1242* (2010.01)
   *B62M 9/1248* (2010.01)

(58) Field of Classification Search
   USPC .................................................. 474/80, 82
   See application file for complete search history.

(56) References Cited

U.S. PATENT DOCUMENTS

| | | | |
|---|---|---|---|
| 4,198,873 A * | 4/1980 | Nagano et al. | 474/82 |
| 4,226,132 A | 10/1980 | Nagano et al. | |
| 4,273,546 A * | 6/1981 | Bergles | 474/82 |
| 4,378,222 A * | 3/1983 | Bergles | 474/82 |
| 4,619,633 A | 10/1986 | Nagano | |
| 4,627,827 A * | 12/1986 | Juy | 474/80 |
| 4,692,131 A * | 9/1987 | Nagano | 474/80 |
| 4,850,940 A * | 7/1989 | Nagano | 474/80 |
| 6,012,999 A * | 1/2000 | Patterson | 474/80 |
| 6,350,212 B1 * | 2/2002 | Campagnolo | 474/80 |
| 7,572,199 B1 * | 8/2009 | Calendrille, Jr. | 474/80 |
| 7,614,972 B2 * | 11/2009 | Oseto | 474/82 |
| 8,900,078 B2 * | 12/2014 | Yamaguchi et al. | 474/80 |
| 2008/0125258 A1 * | 5/2008 | Oseto | 474/80 |
| 2012/0149509 A1 * | 6/2012 | Capogna | 474/80 |

* cited by examiner

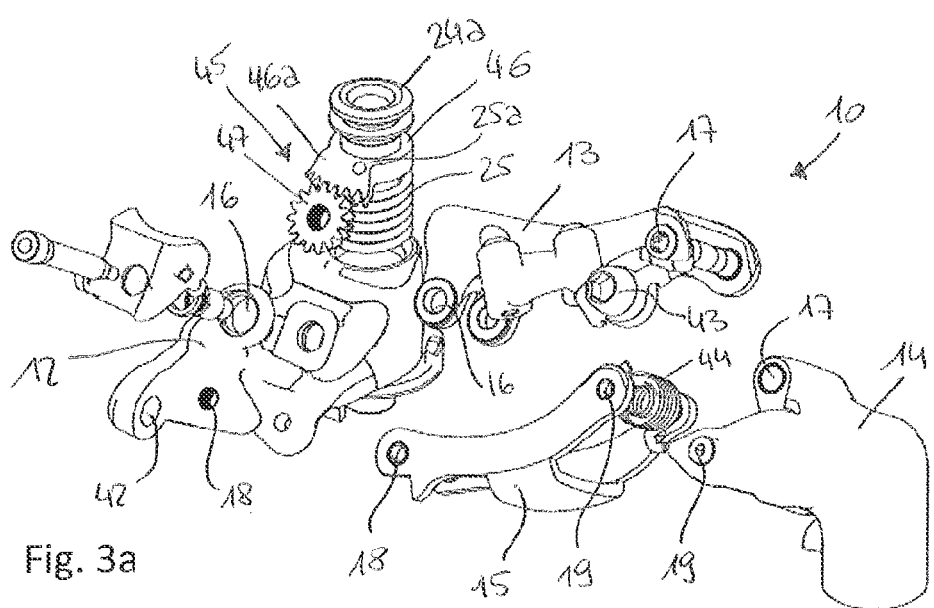
Fig. 3a
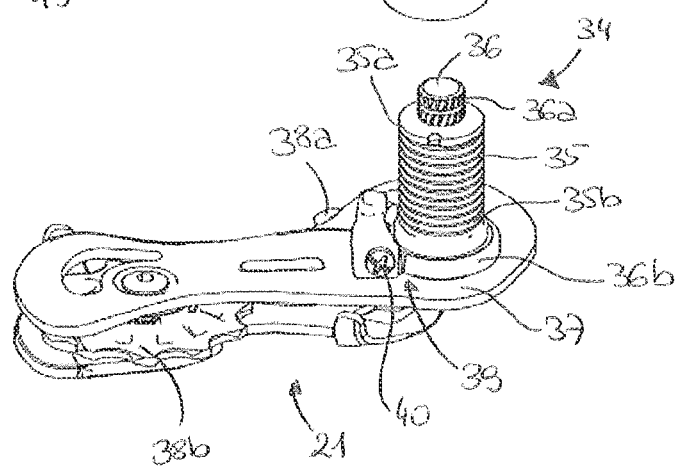

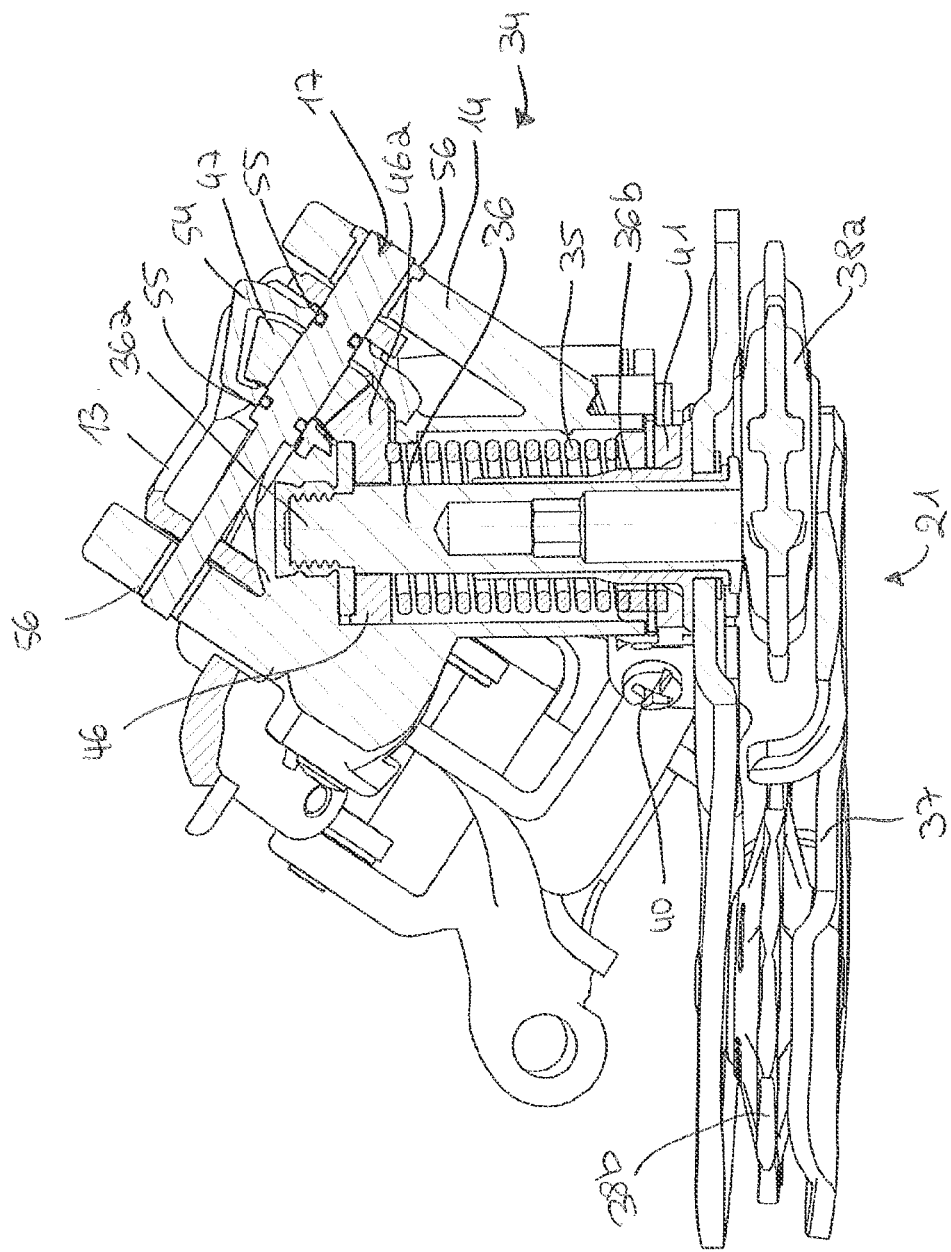

PRIOR ART

BICYCLE GEARSHIFT WITH IMPROVED PRECISION CONTROL

CROSS REFERENCE TO RELATED APPLICATION

This application claims the benefit of Italian Application No. MI2013A000252, which was filed on Feb. 22, 2013, and is incorporated herein by reference as if fully set forth.

FIELD OF INVENTION

The present invention refers to a bicycle gearshift with improved precision control.

BACKGROUND

By bicycle gearshift a mechanical device is meant, that causes the transmission chain to move between different toothed wheels, for this purpose moving a chain guide in which the chain is engaged.

In the context of this patent description and of the following claims, the gearshift being referred to is the rear one that moves the transmission chain between the different sprockets of a cogset associated with the rear wheel of the bicycle.

Normally, the bicycle gearshift comprises a kinematic mechanism in the form of a four-bar linkage (typically an articulated parallelogram) with a base body and a mobile body opposite the base body in the four-bar linkage, connected together through a pair of connecting rods hinged to such bodies according to four hinge axes through four pin elements, in which the base body is fixed to the frame of the bicycle and the mobile body is fixed to a chain guide.

The deformation of the four-bar linkage therefore determines a displacement of the chain guide with respect to the frame in the axial direction with respect to the cogset and, in this way, gearshifting.

The deformation of the four-bar linkage can be obtained with manual actuation, through the movement of control levers and the transmission thereof to the four-bar linkage through a Bowden cable, or with motorized actuation, thanks to an electric motor that—after a suitable command imparted by the cyclist and through a suitable mechanism—moves different parts of the four-bar linkage with respect to one another, thus deforming it and moving the chain guide.

Bicycle gearshifts with motorized actuation are described for example in EP1357023; in them, the kinematic mechanism acts by moving opposite pins of the four-bar linkage towards and away from one another.

An ongoing objective of manufacturers of gearshifts is to improve the precision of actuation, upon which the ease and reliability of operation of the gearshift depends.

This requirement is increasingly important the more the gearshift is intended to be used in high-level cycling competitions.

In order to obtain high precision of control of known bicycle gearshifts, an initial adjustment of the bicycle is made in order to optimise the tensioning of the chain depending on the configuration and structure of the frame and of the cogset associated with the rear wheel.

The initial adjustment acts on at least one spring inserted in the kinematic mechanism, possibly applying a preload thereto, in order to keep the correct tension of the transmission chain in the different travel configurations.

In some gearshifts used particularly for road bicycles, two chain tensioning springs are inserted into the kinematic mechanism, said springs working in antagonism to determine the set-up of the chain guide when engaged with the chain of a transmission. This allows greater versatility of the system, giving it high elasticity. Other gearshifts, on the other hand, can foresee a single chain tensioning spring.

The initial setting of the preload of the chain tensioning springs is carried out so as to raise the chain guide to bring it as close as possible to the sprockets.

Indeed, a small distance between the chain guide and the sprockets determines greater sensitivity of control since, in such conditions, the displacement component of the chain guide parallel to the axis of the sprockets corresponds to an inclination exerted on the chain that is sufficient to trigger a displacement from one sprocket to the other.

The lifting of the chain guide towards the sprockets does, however, have a limitation dictated by the sprocket of largest diameter. Moreover, getting too close to the sprocket with largest diameter is the cause of drawbacks such as the feeling of sudden gearshifting between the lowest gears to the next one, as well as slipping between the chain and the chain guide in the case of the lowest gear and pedalling backwards.

The Applicant has realised that in the adjustment configuration closest to the sprockets, set by the dimensions of the largest sprocket, there is still a substantial vertical spacing between the chain guide and the sprockets with smaller size and, consequently, the precision of gearshifting control between the highest gears is less than between the lower gears.

Therefore, the problem forming the basis of the invention is that of avoiding the aforementioned drawbacks, in particular by providing a bicycle gearshift that is able to offer improved precision gearshifting.

More specifically, the problem forming the basis of the present invention is that of making a bicycle gearshift that allows the distance of positioning between the chain guide and the smaller sized sprockets to be reduced with respect to known gearshifts, without however entailing the drawbacks dictated by bringing the chain guide too close to the largest sprocket.

SUMMARY OF THE INVENTION

The invention foresees a bicycle gearshift comprising a four-bar linkage-kinematic mechanism with a base body and a mobile body connected together through a pair of connecting rods articulated to the base body and to the mobile body at four pin elements, each pair of opposite pin elements of the four pin elements defining a diagonal of the four-bar linkage-kinematic mechanism, the base body comprising a first attachment group to a bicycle frame and the mobile body being connected to a chain guide at a second attachment group, the four-bar linkage-kinematic mechanism being associated with gearshift actuation means suitable for deforming the four-bar linkage-kinematic mechanism so as to determine a displacement of the mobile body with respect to the base body and consequently a primary displacement of the chain guide in the axial direction with respect to the axis of a cogset, at least one from the first attachment group and the second attachment group comprising a chain tensioning spring, the chain tensioning spring determining a set-up of the chain guide when engaged with a chain of a bicycle transmission, characterised in that it comprises a kinematic mechanism for adjusting the preload of the chain tensioning spring as a function of the primary displacement of the chain guide so as to determine a variation in the set-up of the chain guide.

Such changes in the preload of at least one chain tensioning spring advantageously determine an alteration of the trajectory described by the displacement of the chain guide imposed by the controlled deformation of the four-bar linkage.

The trajectory is modified going progressively towards the sprockets of smaller diameter in order to keep the chain guide substantially at the same distance from the sprocket onto which it must direct the chain, irrespective of which sprocket it is.

Moving closer to the smaller sprockets with respect to the solutions of the state of the art determines greater sensitivity of the system to an axial displacement of the chain guide and therefore, overall, a greater precision of control of the gearshift, in particular between the lower gears.

This embodiment of the bicycle gearshift can be further improved through the following additional features that can be combined together as desired.

In accordance with a preferred embodiment of the present invention, the first attachment group comprises a first chain tensioning spring and the second attachment group comprises a second chain tensioning spring, wherein the first and second chain tensioning spring act in antagonism to determine the set-up of the chain guide and the kinematic mechanism for adjusting the preload acts on at least one from the first and the second chain tensioning spring.

When there are two chain tensioning springs the entire system has greater versatility and elasticity, with it also being possible for the kinematic mechanism for adjusting the preload to act in multiple ways in order to modify the trajectory of the chain guide progressively moving towards the sprockets of smaller diameters.

According to a further preferred embodiment of the present invention, the kinematic mechanism for adjusting the preload of at least one chain tensioning spring comprises a rotary body with which the chain tensioning spring engages at a first end thereof so that a rotation of the rotary body determines a variation in preload of the chain tensioning spring, a toothed sector formed on the rotary body and at least one pinion engaged with the toothed sector for transferring a controlled rotation to it, the pinion being directly or indirectly set in rotation by the gearshift actuation means.

In this way it is ensured that the actuation imparted on the gearshift is automatically transferred to the kinematic mechanism for adjusting the preload in a reliable and precise manner.

Preferably, the first and second attachment group comprise a support body intended for fixing to the frame of the bicycle or to the chain guide, wherein the chain tensioning spring is constrained at a second end thereof to the support body and the rotary body with the toothed sector is associated with one from the first and the second attachment group, in a manner such as to be free to rotate with respect to the support body.

Such an embodiment ensures that the rotation of the toothed sector imposes a variation of the preload of the spring in a simple and reliable manner.

The kinematic mechanism for adjusting the preload can adjust the preload of the first chain tensioning spring, of the second chain tensioning spring or of both such springs.

In particular, according to the invention, if the kinematic mechanism for adjusting the preload acts on the first chain tensioning spring, arranged between the base body of the four-bar linkage and the frame, the kinematic adjustment mechanism acts so as to reduce the preload when the chain guide moves towards the largest sprocket or, vice-versa, so as to increase the preload when the chain guide moves towards the smallest sprocket.

On the other hand, if the kinematic mechanism for adjusting the preload acts on the second chain tensioning spring, arranged between the mobile body of the four-bar linkage and the chain guide, the kinematic adjustment mechanism acts so as to increase the preload when the chain guide moves towards the largest sprocket or, vice-versa, so as to reduce the preload when the chain guide moves towards the smallest sprocket.

According to a preferred embodiment, the kinematic mechanism for adjusting the preload operates on both of the chain tensioning springs inserted in the kinematic mechanism of the gearshift according to what is described above.

In accordance with a particularly advantageous embodiment of the present invention, the pinion is mounted in a fixedly connected manner on a pin element of the four pin elements, where the pin element is fixedly connected to one of the connecting rods.

In such embodiments, the kinematic mechanism for adjusting the preload is actuated directly by a relative rotation between the base body/the mobile body and a connecting rod.

In this way a solution is obtained that is particularly simple from the structural point of view for reliably correlating the deformation of the four-bar linkage and the variation of the preload of the spring.

Alternatively, the pinion is mounted in a fixedly connected manner on an actuation pin substantially parallel to the pin elements and set in rotation by the gearshift actuation means.

Preferably, the pinion is covered through a protective element with matching hollow configuration, where the protective element is provided with a window suitable for allowing the engagement of the pinion with the toothed sector of the rotary body and it is mounted on the pin element in a rotary manner with respect to it.

Preferably, the gearshift actuation means are of the motorized type and comprise a motor that drives the displacement of a shaft along a diagonal of the four-bar linkage-kinematic mechanism.

Such a particularly advantageous embodiment makes it possible to also motorise the spring preload variation action gaining greater precision of gearshifting. Moreover, the cyclist is required to apply a minimal actuation force, since gearshifting and the variation in preload of the spring obtained by the action of the actuation means is motorised.

Even more preferably, the motor is supported inside the four-bar linkage-kinematic mechanism through a support shell constrained in a tilting manner at a first pin element of the four pin elements, wherein the shaft acts on a pin element of the four pin elements opposite the first.

Such an embodiment is particularly versatile since it can use a plurality of actuation means, also including devices that are known and widely available on the market, whilst still keeping the characteristic compactness required of a bicycle gearshift unchanged.

In such an embodiment, the first pin element is advantageously made up of a pair of half-pins that engage in free rotation in two opposite seats of the support shell, wherein the pinion is mounted in a fixedly connected manner on a first half-pin of the pair of half-pins.

Preferably, the motor has its outlet axis perpendicular to the shaft and sets the actuation pin in rotation, wherein the actuation pin carries a toothed spindle that rotates as a unit with it in shape coupling with a rack formed on the shaft in order to determine a displacement in translation of the shaft.

The rack is preferably guided in translation inside a tubular portion of a guide shell idly mounted on the actuation pin, wherein the guide shell encloses the toothed spindle in order to maintain the shape coupling between the toothed spindle and the rack.

The Applicant has found that with such a structure it is possible to obtain a particularly compact and precise solution. Moreover, the actuation of the kinematic mechanism for adjusting the preload takes place in a substantially direct manner through the motor.

According to a further alternative, the gearshift actuation means are of the mechanical type and comprise:
- a sheath seat for the support of a control cable comprising an outer sheath relative to which an inner cable core is free to slide, wherein the sheath seat fixes the outer sheath in position in order to allow the sliding of the inner core,
- a retaining clip of one end of the inner core, wherein the sheath seat and the clip are arranged substantially at pin elements that are diagonally opposite in the four-bar linkage-kinematic mechanism,
- a return spring arranged at one of the pin elements, to deform the four-bar linkage-kinematic mechanism in contrast to the traction imposed by a relative translation between the outer sheath and the inner core of the control cable.

In such a variant provided with mechanical actuation there are advantages in terms of response times to the actuation command characteristic of a direct actuation like a mechanical one.

Preferably, the first attachment group comprises a pair of clamping screws arranged coaxially so as to be able to slide one inside the other and a locking element that is able to rotate with respect to the clamping screws, wherein the locking element is provided with a stop tooth suitable for limiting the rotation thereof with respect to the frame, the first chain tensioning spring engages at its second end in a hole of the locking element, and the clamping screws and the locking element act as such a support body of the first chain tensioning spring.

Advantageously, in this embodiment the first chain tensioning spring also acts as a shock-absorbing spring, absorbing possible external forces beyond a certain limit that could cause damage to the gearshift.

Preferably, the second attachment group comprises a fifth pin element connected, at a first end, in a fixedly connected manner to the chain guide and provided, at a second end, opposite the first, with a connection interface to the mobile body, wherein the fifth pin element acts as such a support body of the second chain tensioning spring.

BRIEF DESCRIPTION OF THE DRAWINGS

Further features and advantages of the present invention will become clearer from the following detailed description of some preferred embodiments thereof, made with reference to the attached drawings. The different features in the single configurations can be combined together as desired according to the previous description, if it is necessary to have the advantages resulting specifically from a particular combination.

In such drawings:

FIGS. 3a and 3b respectively show an exploded view and a section view along the line B-B of FIG. 2 of a first embodiment of the bicycle gearshift according to the present invention;

FIGS. 6a and 6b respectively show an exploded view and a section view along the line B-B of FIG. 2 of a fourth embodiment of the bicycle gearshift according to the present invention;

DETAILED DESCRIPTION OF THE PREFERRED EMBODIMENT(S)

Figure 1:
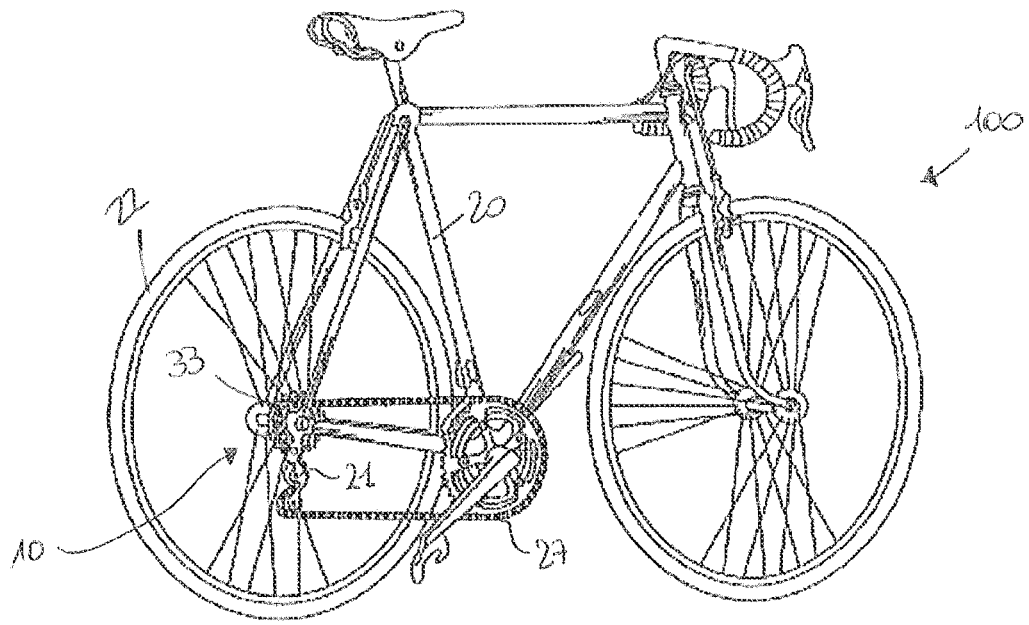
FIG. 1 is a schematic side view of a racing bicycle using a bicycle gearshift according to the present invention.
Figure 2:
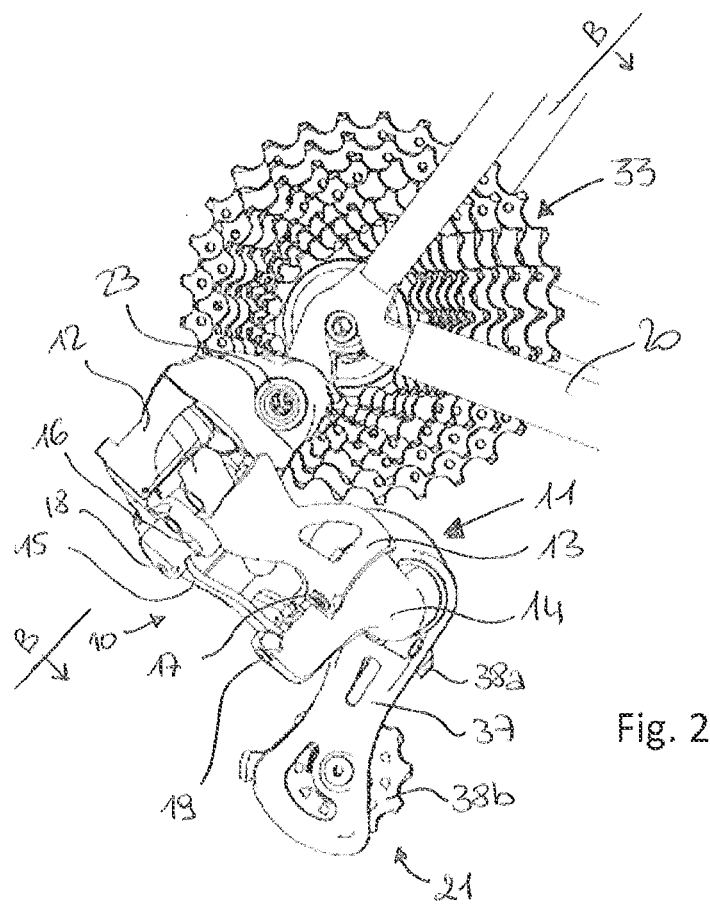
FIG. 2 shows a bicycle gearshift according to the present invention associated with a bicycle frame and with a cogset.
Figure 3B:
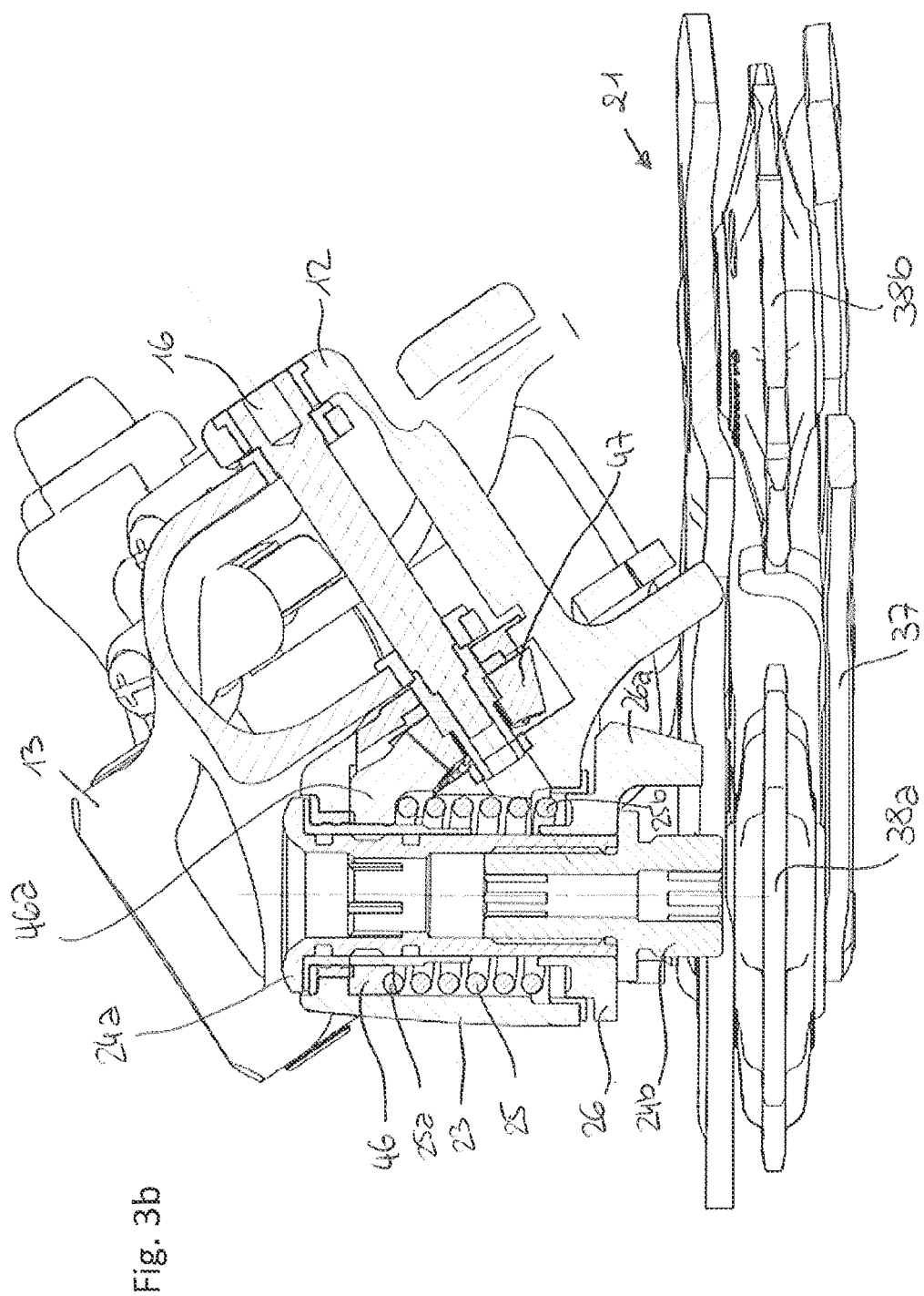

In the following description, in order to illustrate the figures identical reference numerals are used to indicate constructive elements with the same function.

With reference to the figures, a bicycle gearshift is shown, wholly indicated with 10. The bicycle gearshift 10 to which reference is made is the rear one that move a transmission chain 27 between a plurality of sprockets 33 having axis A, associated with a rear wheel 22 of a bicycle 100.

The bicycle gearshift 10 comprises a kinematic mechanism in the form of a four-bar linkage 11 with a base body 12 and a mobile body 14 connected together through a pair of connecting rods 13,15 a first of which 13 is articulated to the base body 12 at a first hinge axis through a first pin element 16 and to the mobile body 14 at a second hinge axis through a second pin element 17, whereas a second connecting rod 15 is articulated to the base body 12 at a third hinge axis through a third pin element 18 and to the mobile body 14 at a fourth hinge axis through a fourth pin element 19.

The base body 12 is intended to be fixed in a rotatable manner to a frame 20 of the bicycle 100.

The mobile body 14, opposite the base body 12 in the four-bar linkage 11, carries a chain guide 21.

The chain guide 21 comprises a rocker arm 37 bearing an upper roller 38a and a lower roller 38b for relaying a closed-loop transmission chain 27.

For the rotatable coupling between the base body 12 and the frame 20 there is a first attachment group 23 that comprises a pair of clamping screws 24a, 24b arranged coaxially so as to be able to slide one inside the other in such a way clamping the base body 12 on the frame 20.

A first chain tensioning spring 25 is preferably mounted on the clamping screws 24a, 24b, coaxially to them 24a, 24b.

There are also means (not illustrated) for setting the preload of such a first chain tensioning spring 25.

Such initial adjustment of the first chain tensioning spring 25, generally carried out during assembly, has the purpose of adapting the bicycle gearshift 10 to the different types of frames 20 and sprockets 33, influencing the positions that can be taken up by the chain guide 21 with respect to such a frame 20 and, consequently, with respect to the sprockets 33.

In particular, the first chain tensioning spring 25 transfers its action to the base body 12 in order to counteract/limit a relative rotation between the base body 12 and the frame 20 and keep the transmission chain 27 in the correct tension condition. For this purpose, a first end thereof 25a is indirectly associated with the base body 12.

A second end 25b of the first chain tensioning spring 25 engages in a hole (not illustrated) of a locking element 26 provided with a stop tooth 26a that goes into abutment against a protrusion (not illustrated) made on the frame 20.

The locking element 26 and the clamping screws 24a, 24b are rotatable with respect to the base body 12 and act as support body of the first chain tensioning spring 25.

For the rotatable coupling between the mobile body 14 and the rocker arm 37 of the chain guide 21 there is a second attachment group 34 that comprises a fifth pin element 36 provided, at a first end thereof 36a, with a connection interface to the mobile body 14 and connected, at a second end 36b, opposite the first, in a fixed manner to the rocker arm 37.

A second chain tensioning spring 35 is preferably mounted coaxial to the fifth pin element 36.

The second chain tensioning spring 35 acts on the tensioning chain 27 in antagonism to the first 25 spring in order to determine a balanced condition that defines the positions that can be taken up by the chain guide 21 with respect to the frame 20.

The second chain tensioning spring 35 engages, at a first end thereof 35a, with the connection interface to the mobile body 14 in order to counteract/limit a relative rotation between the mobile body 14 and the rocker arm 37 and keep the transmission chain 27 in the correct tension condition.

At the second end 36b of the fifth pin element 36 there is an adjustment system 39 of the preload of the second chain tensioning spring 35 that, in the illustrated embodiment, comprises a screw 40 that acts on a base shaped like a toothed ring 41 constrained at the bottom to the second chain tensioning spring 35 at a second end thereof 35b.

Also in this case, the initial adjustment of the preload has the purpose of adapting the bicycle gearshift 10 to different types of frames 20 and sprockets 33.

There are also actuation means 28 of the gearshift suitable for modifying the set-up of the four-bar linkage-kinematic mechanism 11 so as to determine a relative movement of the mobile body 14 towards/away from the base body 12 and, consequently, a displacement of the chain guide 21 with respect to the frame 20.

In the first and fourth preferred embodiments illustrated, respectively in FIGS. 3a-3b and 6a-6b mechanical actuation means 28 are provided for, that comprise at least one control lever (not illustrated) placed in connection to the four-bar linkage-kinematic mechanism 11 through a control cable of the Bowden type (not illustrated), namely comprising an outer sheath relative to which an inner cable core is free to slide.

The four-bar linkage-kinematic mechanism 11 is provided with a sheath seat 42 for supporting the control cable and fixing the outer sheath thereof in position in order to allow the relative sliding between the inner core of the cable with respect to the outer sheath.

There is also a retaining clip 43 of the end of the core of the control cable arranged, in relation to the four-bar linkage-kinematic mechanism 11, in a position diagonally opposite the sheath seat 42, so that the traction imposed by a relative movement between the sheath and the core of the cable determines a deformation of the four-bar linkage-kinematic mechanism 11.

In the illustrated embodiment, the sheath seat 42 is made on the base body 12, preferably at the third pin element 18, and the retaining clip 43 is arranged on the first connecting rod 13, preferably at the second pin element 17.

The traction action imposed by the relative movement between the sheath and the core of the cable is counteracted by a return spring 44 arranged at the fourth pin element 19.

The second and third preferred embodiment respectively illustrated in FIGS. 4a-4b and 5a-5b provide for actuation means 28 of the motorised type.

The motorised actuation means 28 comprise a motor 30 that drives the displacement of a shaft 29 that acts between diagonally opposite pin elements 16, 17, 18, 19 to impose a mutual displacement between the mobile body 14 and the base body 12.

In this way, the actuation means 28 are arranged along a diagonal of the four-bar linkage 11 and the actuation thereof causes a lengthening/shortening of the distance between the two opposite pin elements 16, 17, 18, 19 and therefore a deformation of the four-bar linkage-kinematic mechanism 11.

Preferably, the free end of the shaft 29 is constrained to a pin element 16, 17, 18, 19 through the interposition of a release element 57.

In accordance with the second preferred embodiment, the motor 30 is supported inside the four-bar linkage-kinematic mechanism 11 through a support shell 31 constrained in a tilting manner to the pin element opposite the pin element constrained to the free end of the shaft 29.

In particular, in such an embodiment, the shaft 29 acts on the fourth pin element 19 and the support shell 31 of the motor is constrained in a tilting manner to the first pin element 16. For this purpose, the first pin element 16 is made up of two half-pins 16a, 16b that engage so as to be able to rotate freely in two opposite seats 32a, 32b of the support shell 31.

Figure 4A:
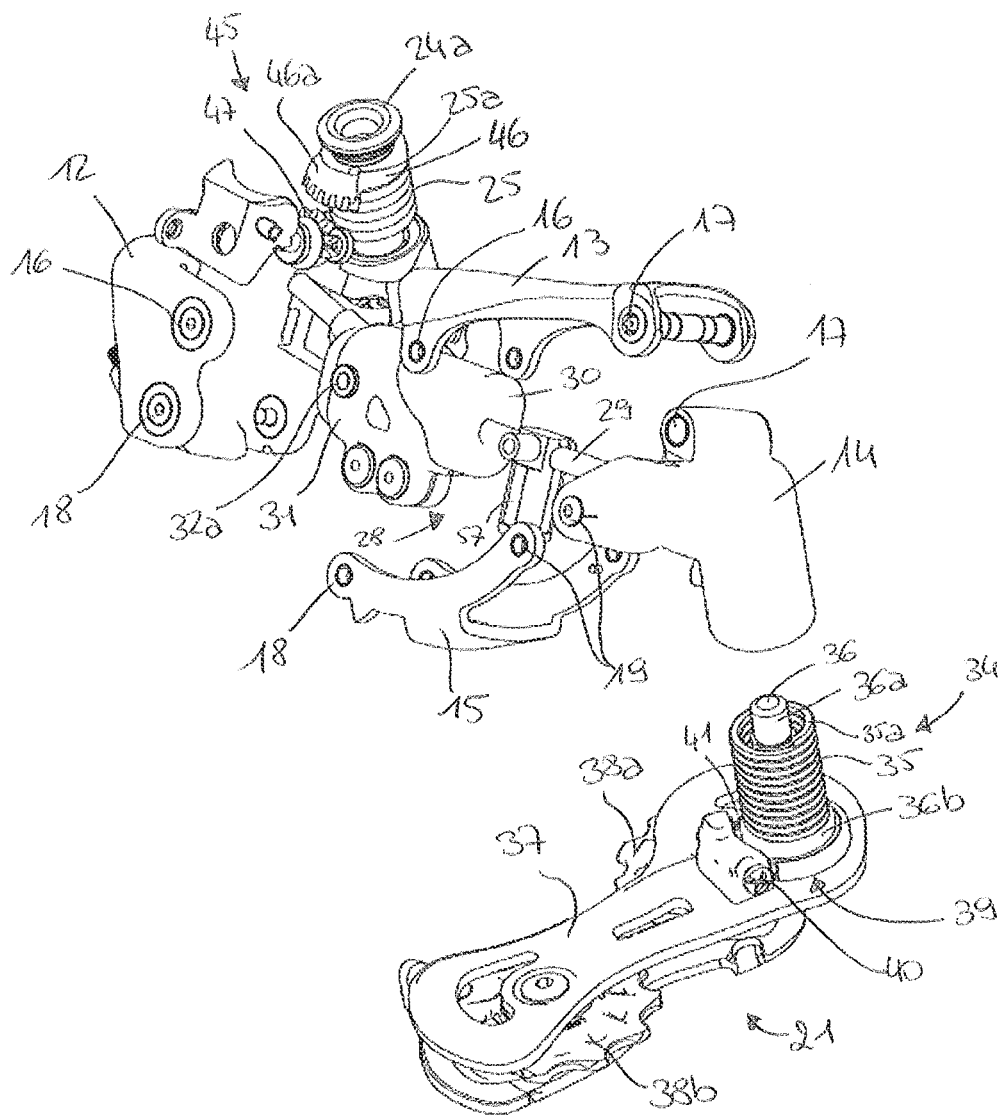
FIGS. 4a and 4b respectively show an exploded view and a section view along the line B-B of FIG. 2 of a second embodiment of the bicycle gearshift according to the present invention.
Figure 4B:
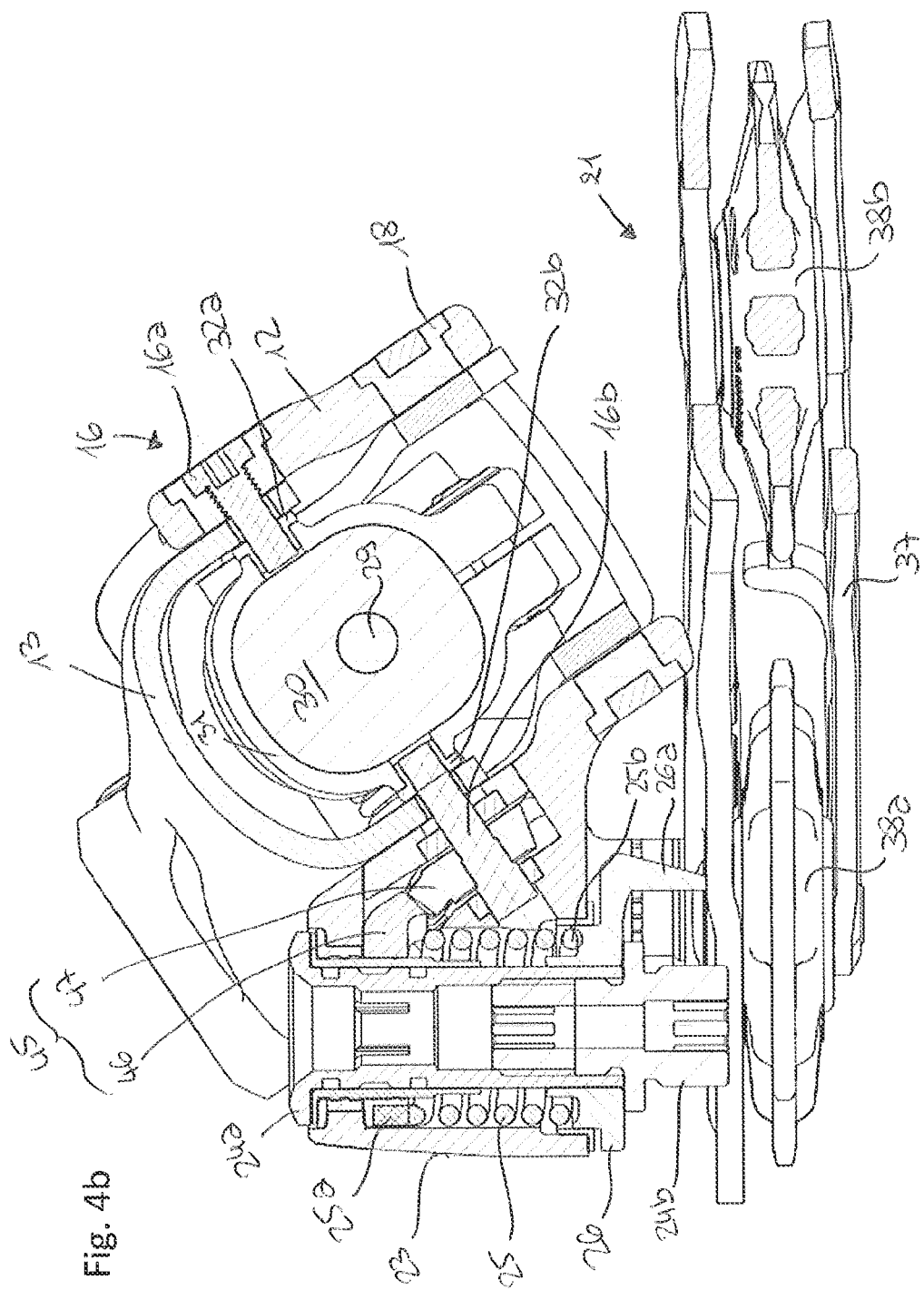

In the preferred embodiment of FIGS. 4a-4b, the motor 30 is of the electric type and drives the displacement in pure translation of the shaft 29.

According to a further preferred embodiment (not illustrated), the motor 30 is of the type described in EP1357023, having a screw arranged axially along the motor axis and set in rotation by the motor 30 and a mother screw in meshing engagement with the screw, fixed to an opposite pin element 19 with respect to the pin element 16 that carries the tilting shell 31 of the motor 30.

Figure 5A:
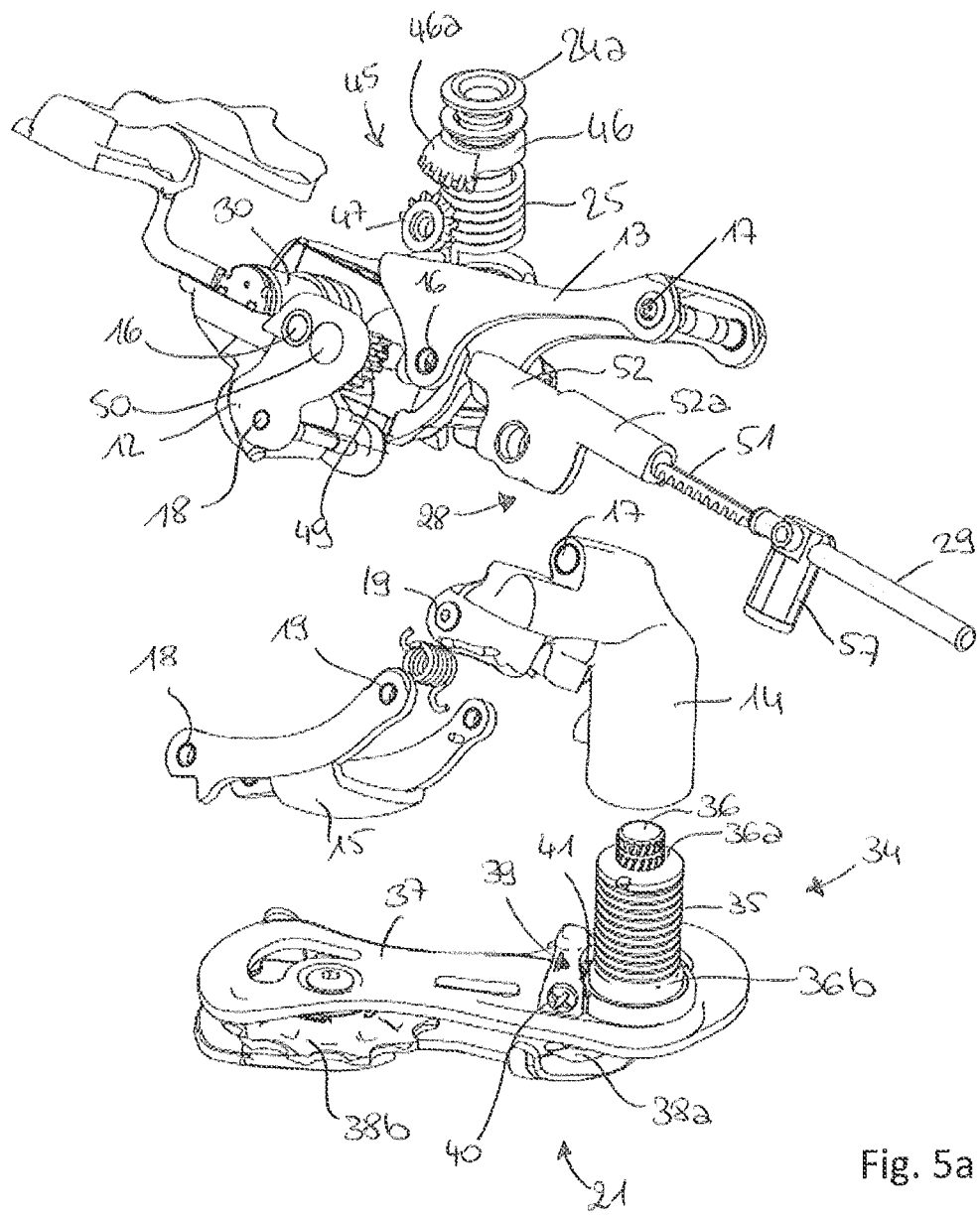
FIGS. 5a and 5b respectively show an exploded view and a section view along the line B-B of FIG. 2 of a third embodiment of the bicycle gearshift according to the present invention.
Figure 5B:
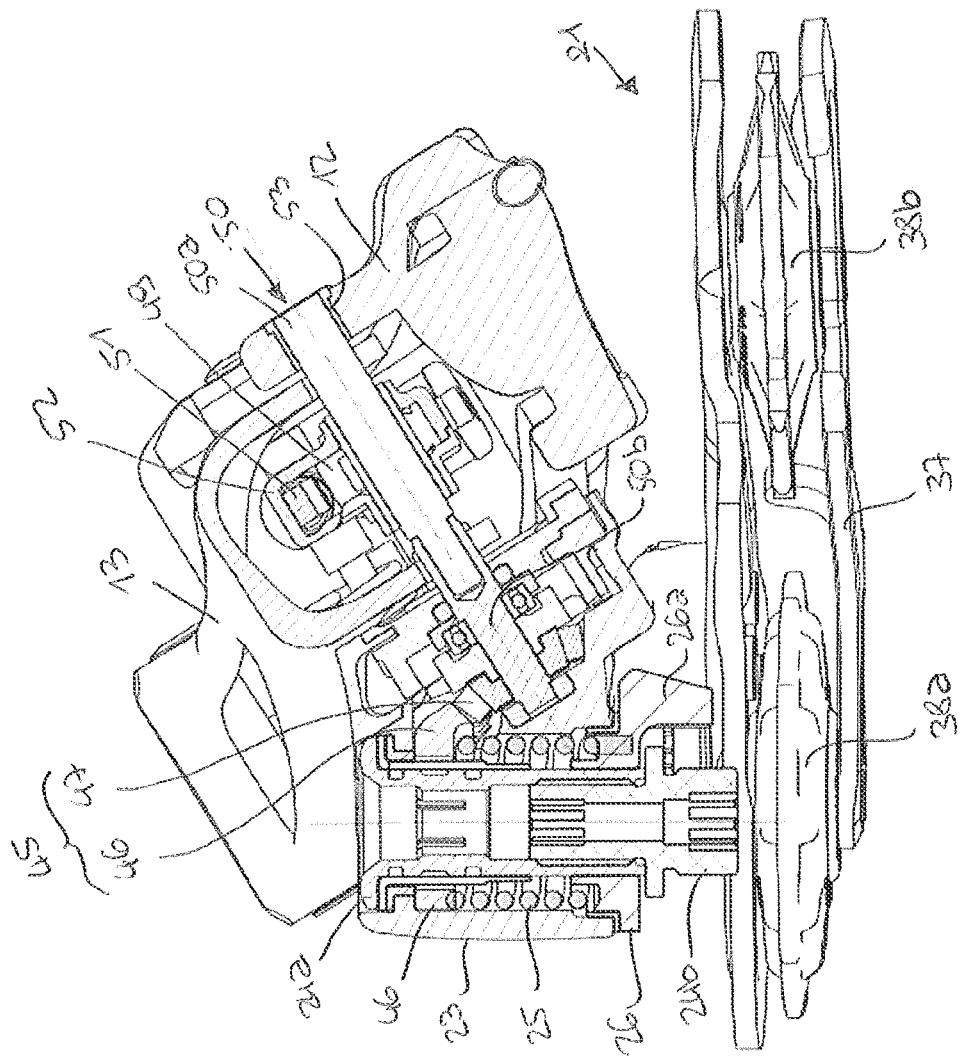

The preferred embodiment of FIGS. 5a-5b foresees the use of an electric motor 30 with rotary outlet shaft (not illustrated). In such a third embodiment, the motor 30 is arranged inside the four-bar linkage-kinematic mechanism 11 so as to have its rotary outlet axis (not shown) arranged perpendicular to the shaft 29 arranged between diagonally opposite pin elements.

A reduction stage (not illustrated) is also provided for, suitable for transferring the rotary motion of the outlet shaft of the motor 30 to an actuation pin 50 substantially arranged between the first 16 and the third 18 pin element and parallel to them.

The actuation pin 50 is free to rotate with respect to the first connecting rod 13 and to the base body 12 and carries a toothed spindle 49 that rotates as a unit with it 50 suitable for cooperating, by shape coupling, with a rack 51 formed on the shaft 29 in order to determine a displacement in translation thereof.

The shape coupling between the toothed spindle 49 and the rack 51 is preferably maintained through a guide shell 52 idly mounted on the actuation pin 50.

The guide shell 52 is provided with a tubular portion 52a in which the rack 51 is free to translate.

The actuation pin 50 preferably consists of two actuation half-pins 50a, 50b fixedly connected to one another. The two actuation half-pins 50a, 50b are free to rotate with respect to the first connecting rod 13 and to the base body 12. For this purpose, the first semi-actuation pin 50a inserts in the base body 12 through interposition of a first sliding bush 53.

According to the present invention, the bicycle gearshift 10 comprises means 45 for adjusting the preload of at least one chain tensioning spring 25, 35 of the first 25 and second 35 chain tensioning spring, suitable for changing the preload thereof 25, 35 as a function of a primary displacement of the chain guide 21 in the axial direction along the axis A of the sprockets 33, so as to determine a variation in the set-up of the chain guide 21.

The means 45 for adjusting the preload of at least one chain tensioning spring 25, 35 comprise a rotary body 46 provided with at least one toothed sector 46a in which the chain tensioning spring 25, 35 engages at its first end 25a, 35a so that a rotation of the rotary body 46 determines a variation in preload of the chain tensioning spring 25, 35 with which it is associated and at least one pinion 47, preferably having a frusto-conical configuration, which engages with the toothed sector 46a in order to transfer a controlled rotation to it.

In particular, the rotary body 46 is arranged coaxially to the at least one chain tensioning spring 25, 35 and is free to rotate with respect to the support body on which the spring is mounted. (consisting of the clamping screws 24a, 24b and the locking element 26 in the first, second and third embodiment, whereas in the fourth embodiment it consists of the fifth pin element 36).

The pinion 47 is mounted in a fixedly connected manner on a pin element 16, 17, 50 or half-pin 16b, 50b to which the controlled rotation is imparted that at the same time determines a displacement of the chain guide 21 having at least one axial component.

The controlled rotation can be imparted to the pin element 16, 17, 50 or half-pin 16b, 50b in a different way according to the specific embodiments.

According to the first and second preferred embodiment respectively illustrated in FIGS. 3a-3b and 4a-4b, the means 45 for adjusting the preload are actuated through a relative rotation between the base body 12 and the first connecting rod 13 of the four-bar linkage-kinematic mechanism 11.

Such a relative rotation between the base body 12 and the first connecting rod 13 also determines a deformation of the four-bar linkage-kinematic mechanism 11 and, consequently, a primary displacement of the chain guide 21 along the axis A.

So that a rotation between base body 12 and connecting rod 13 determines a rotation of the pinion 47, the latter is fixedly connected to the first pin element 16 or to a first half-pin 16b of the first pin element 16, which is in turn fitted to the first connecting rod 13.

In this way, the movement of the first connecting rod 13 causes the movement of the first pin element 16 or of the first half-pin 16b which, in turn, determines a rotation of the pinion 47 and, consequently, of the toothed sector 46a of the rotary body 46 in which the first end 25a of the first chain tensioning spring 25 engages.

In this way, there is therefore a variation of the preload of such a first chain tensioning spring 25 correlated to an axial displacement of the chain guide 21.

According to the third preferred embodiment illustrated in FIGS. 5a-5b, the means 45 for adjusting the preload are actuated through the rotation of the actuation pin 50 or, in particular, of the first semi-actuation pin 50a, imparted by the motor 30 through the reduction stage.

In this way, the pinion 47 mounted fixedly connected to the second semi-actuation pin 50b, in turn fixedly connected to the first 50a, is also set in rotation, transferring the rotary motion to the toothed sector 46a of the rotary body 46 with which it is in shape coupling.

Such a rotation of the toothed sector 46a in which the first end 25a of the first chain tensioning spring 25 engages determines a variation of the preload of the spring.

Given that the rotation of the actuation pin 50 imparted by the motor 30 also determines a rotation of the toothed spindle 49 and, consequently, a linear translation of the shaft 29 after the coupling between the toothed spindle 49 and the rack 51, there is simultaneously a deformation of the four-bar linkage-kinematic mechanism 11 which in turn determines a primary displacement of the chain guide 21 along the axis A.

Also in this case, therefore, the variation in preload of the first chain tensioning spring 25 is correlated to an axial displacement of the chain guide 21.

In the first three preferred embodiments, once the deformation of the four-bar linkage-kinematic mechanism 11 has ended and a stable engagement condition of the transmission chain 27 with a sprocket 33 has been reached, the first chain tensioning spring 25 transfers its action to the base body 12 through the fixed constraint that is established between the toothed sector 46a of the rotary body 46 with the pinion 47.

The pinion 47 is indeed in turn fitted to a pin element 16, 17, 50 or half-pin 16b, 50b that, in such a stable condition, is fixedly connected to the base body 12.

Figure 6A:
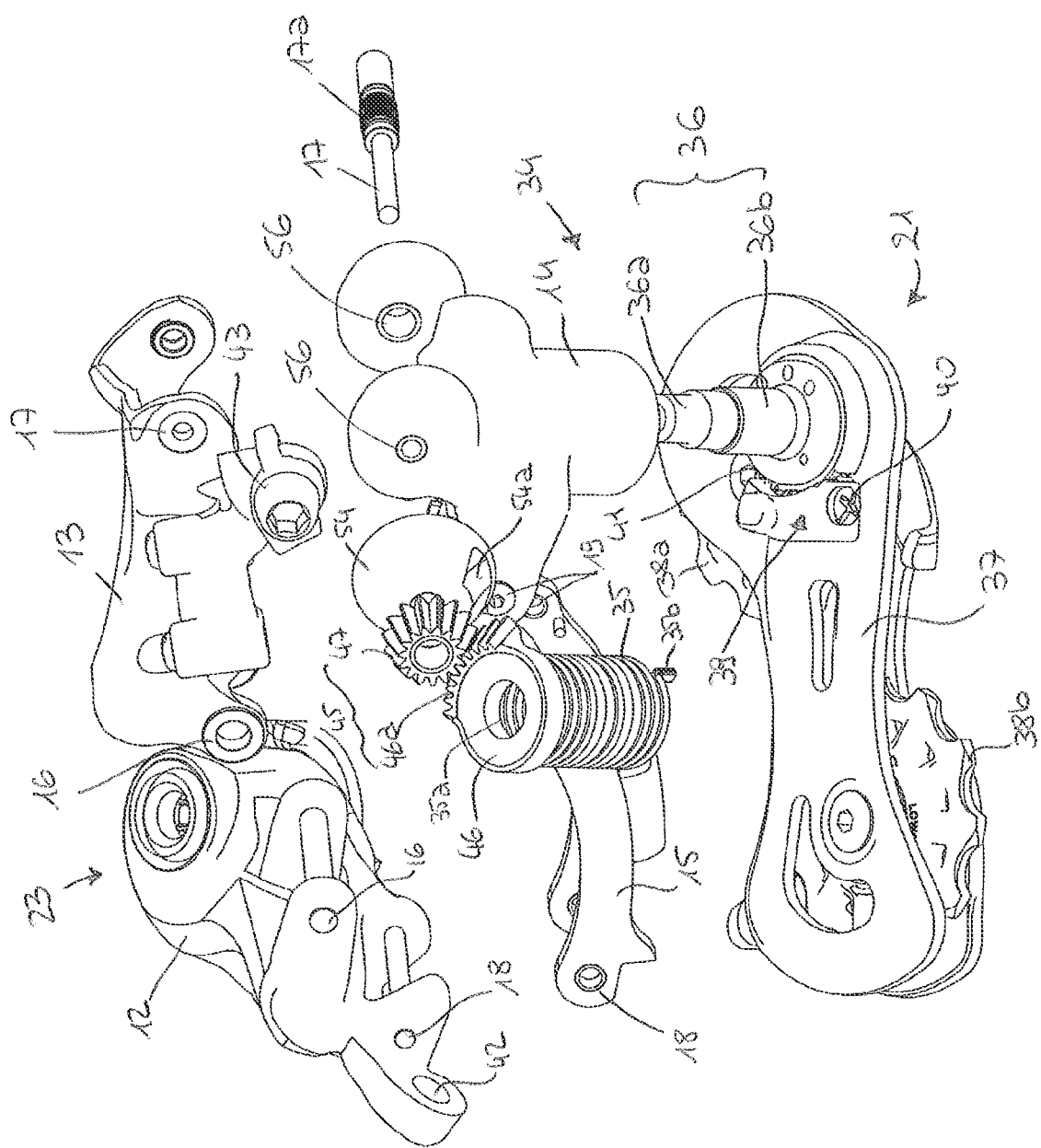
Figure 7A:
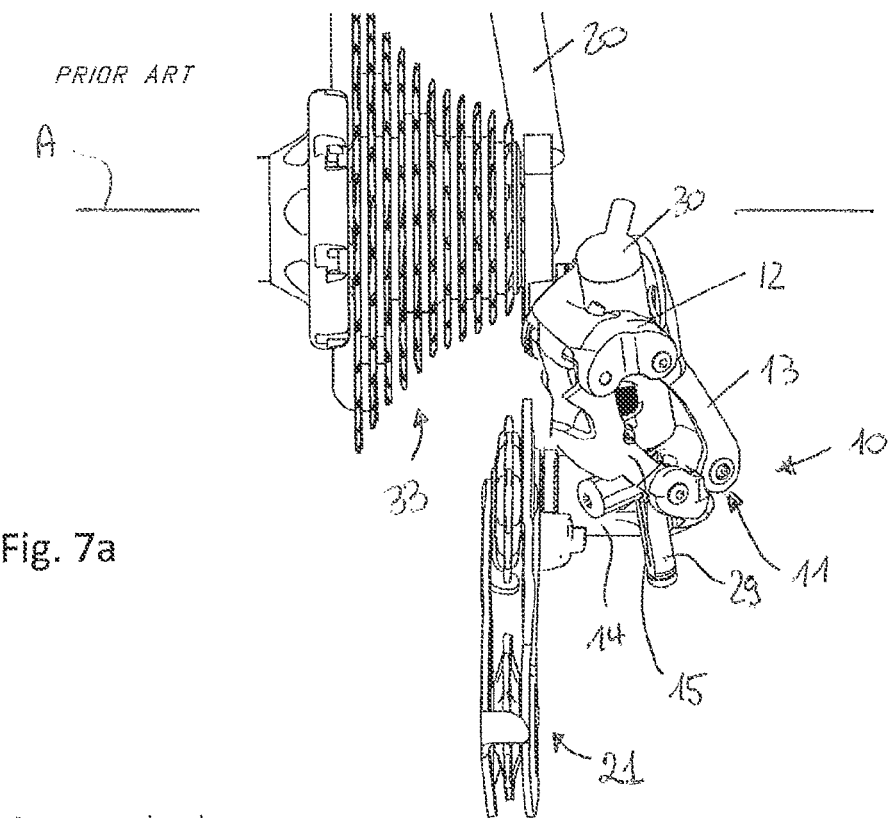
FIGS. 7a and 7b show a rear view of a gearshift of the state of the art and of a gearshift according to the present invention, respectively, in a first position.
Figure 7B:
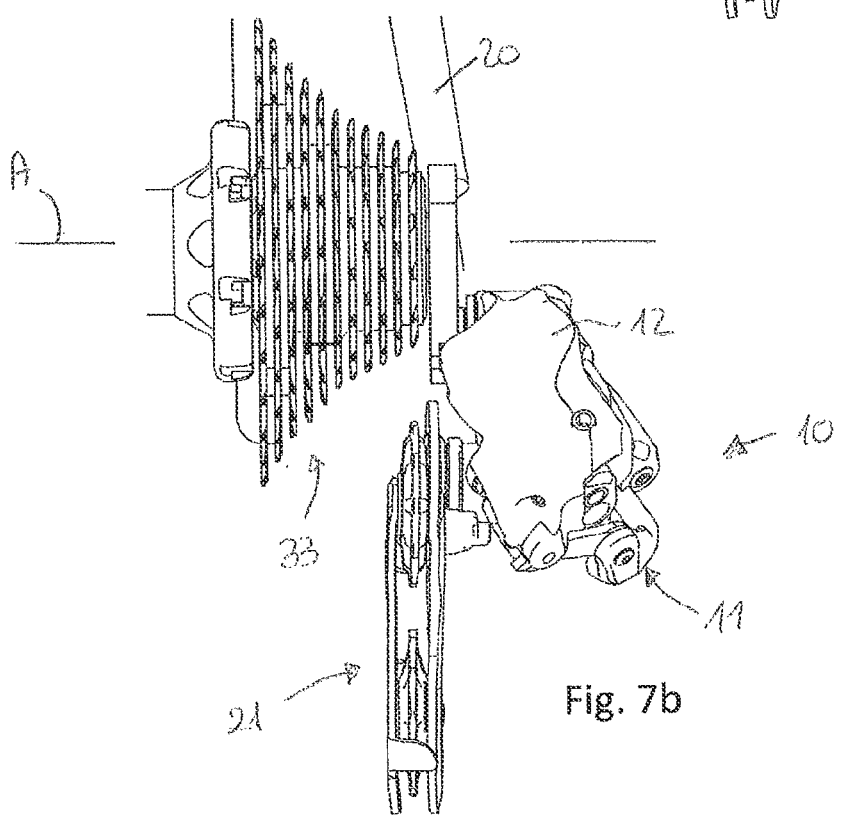
Figures 8A, 8B:
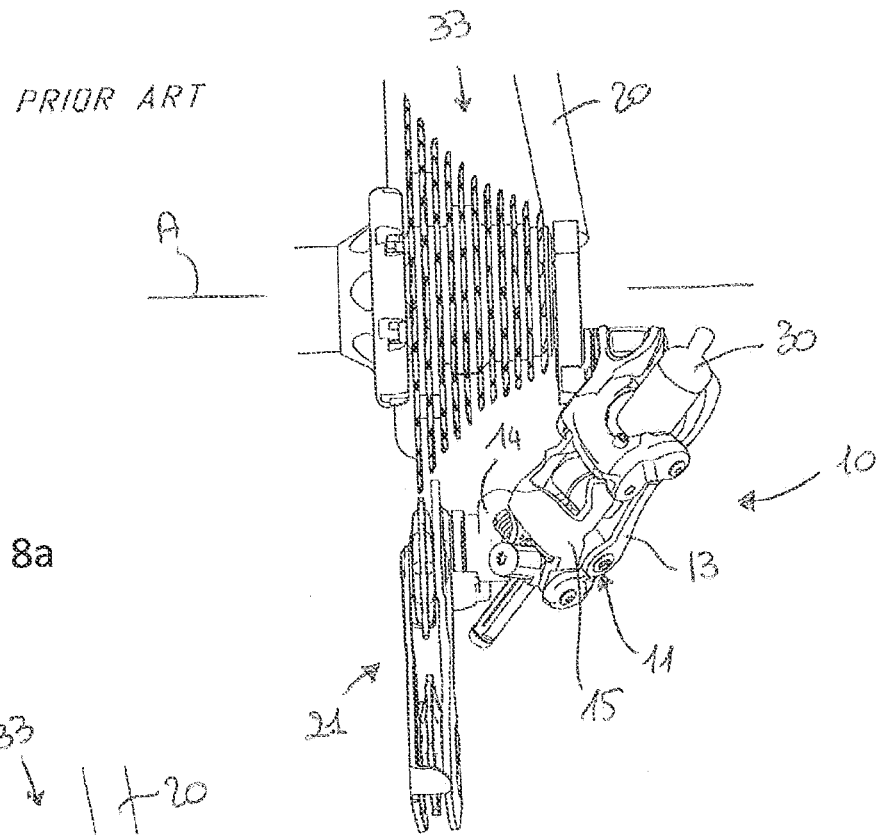
FIGS. 8a and 8b show a rear view of a gearshift of the state of the art and of a gearshift according to the present invention, respectively, in a last position.

According to the fourth preferred embodiment illustrated in FIGS. 6a-6b, the means 45 for adjusting the preload are actuated through a relative rotation between the mobile body 14 and the first connecting rod 13 of the four-bar linkage-kinematic mechanism 11 imparted by the mechanical actuation means 28.

For this purpose the pinion 47 is mounted in a fixedly connected manner on the second pin element 17 which is in turn constrained to the first connecting rod 13 in such a way that its rotation is blocked.

Such blocking of the relative rotation between the second pin element 17 and the first connecting rod 13 is obtained for example through a knurled surface portion 17a made on the second pin element 17.

The pinion 47 is advantageously covered through a protective element 54 with hollow configuration, preferably matching the configuration of the pinion, provided with a window 54a that allows the engagement of the pinion 47 with the toothed sector 46a of the rotary body 46.

In the illustrated embodiment, in which the pinion 47 has a frusto-conical configuration, the protective element 54 also has a hollow frusto-conical configuration.

The protective element 54 is mounted on the second pin element 17 in a rotatable manner with respect to it, thanks to the interposition of sliding bearings 55.

The second pin element 17 is rotatable with respect to the mobile body 14 thanks to the interposition of a pair of second sliding bushes 56, therefore allowing a relative rotation between the first connecting rod 13 and the mobile body 14.

The relative rotation between the first connecting rod 13 with respect to the mobile body 14 causes a rotation of the second pin element 17 which, in turn, determines a rotation of the pinion 47 that is transferred to the toothed sector 46a in which the first end 35a of the second chain tensioning spring 35 present on the mobile body 14 engages. In this way, therefore, there is a variation of the preload of such a second chain tensioning spring 35.

The relative rotation between the first connecting rod 13 and the mobile body 14 also determines a deformation of the four-bar linkage-kinematic mechanism 11 and, consequently, a primary displacement of the chain guide 21 along the axis A.

According to this fourth embodiment therefore, the variation of the preload of the second chain tensioning spring 35 is correlated to an axial displacement of the chain guide 21.

The operation of the bicycle gearshift 10 according to the invention is as follows.

Following actuation of the gearshift 10, the chain guide 21 is moved along a direction having at least one axial component, i.e. a component parallel to the axis A of the sprockets 33, to go up to the sprocket 33 on which the transmission chain 27 must be positioned.

FIGS. 7a-7b and 8a-8b respectively show a gearshift of the state of the art and a gearshift according to the present invention in the first and last position, i.e. at the smallest sprocket 33 and at the largest one.

Such a displacement is determined by a deformation of the four-bar linkage-kinematic mechanism 11 controlled through the mechanical or motorised actuation means 28 according to the particular embodiment.

After the actuation through the relative means 28, an actuation of the kinematic mechanism for adjusting the preload 45 takes place, that acts on at least one of the two chain tensioning springs 25, 35 to modify the preload thereof.

This results in a new balanced set-up being reached in the antagonist action between the two chain tensioning springs 25, 35 that, in the case of the highest positions, at the largest sprockets, determines a vertical distancing of the chain guide 21 from them.

It is therefore possible, at the assembly stage of the bicycle 100, to adjust the chain tensioning springs 25, 35 so that, in the first positions, they can maintain a shorter distance of the chain guide 21 from the sprockets with a smaller diameter.

The configuration change effect obtained through the gearshift 10 according to the present invention is clearly shown from the comparison between FIGS. 7a-7b and 8a-8b.

From the description that has been made the features of the bicycle gearshift according to the present invention are clear, just as the relative advantages are also clear.

Thanks to the variation of the preload of at least one chain tensioning spring it is possible to reach relative positions between the chain guide and the sprockets that make it possible, on the one hand, to obtain greater sensitivity of control with respect to gearshifts of the state of the art, and on the other hand to reduce the drawbacks linked to the chain guide getting too close to the sprocket with the largest diameter.

From the embodiments described above further variants are possible, without departing from the teaching of the invention.

Indeed, it is possible to foresee for the kinematic mechanism for adjusting the preload to acts simultaneously on both the chain tensioning springs.

Moreover, the gearshift actuation means can be of a different type or arranged so as to act on a different diagonal of the four-bar linkage-kinematic mechanism with respect to those illustrated in the preferred but not limiting embodiments discussed.

Finally, it is clear that the bicycle gearshift thus conceived can undergo numerous modifications and variants, all of which are covered by the invention; moreover, all of the details can be replaced by technically equivalent elements. In practice, the materials used, as well as the sizes, can be whatever according to the technical requirements.

What is claimed is:

1. Bicycle gearshift comprising a kinematic mechanism in the form of a four-bar linkage with a base body and a mobile body connected together through a pair of connecting rods articulated to said base body and to said mobile body at four pin elements, each pair of opposite pin elements of said four pin elements defining a diagonal of said four-bar linkage-kinematic mechanism, said base body comprising a first attachment group to a bicycle frame and said mobile body being connected to a chain guide at a second attachment group, said four-bar linkage-kinematic mechanism being associated with gearshift actuation means suitable for deforming said four-bar linkage-kinematic mechanism so as to determine a displacement of said mobile body with respect to said base body and consequently a primary displacement of said chain guide in the axial direction with respect to the axis (A) of a cogset, at least one from said first attachment group and said second attachment group comprising a chain tensioning spring, said chain tensioning spring determining a set-up of the chain guide when engaged with a chain of a bicycle transmission, further comprising a kinematic mechanism that adjusts the preload of said chain tensioning spring as a function of said primary displacement of said chain guide in the axial direction with respect to the axis (A) of the cogset.

2. Bicycle gearshift according to claim 1, wherein said first attachment group comprises a first chain tensioning spring and said second attachment group comprises a second chain tensioning spring, said first and said second chain tensioning spring acting in antagonism to determine said set-up of the chain guide, said kinematic mechanism for adjusting the preload acting on at least one of said first and said second chain tensioning spring.

3. Bicycle gearshift according to claim 1, wherein said kinematic mechanism for adjusting the preload of at least one chain tensioning spring comprises a rotary body with which said chain tensioning spring engages at a first end thereof so that a rotation of said rotary body determines a variation in preload of said chain tensioning spring, a toothed sector formed on said rotary body and at least one pinion engaged with said toothed sector to transfer a controlled rotation to it, said pinion being directly or indirectly set in rotation by said gearshift actuation means.

4. Bicycle gearshift according to claim 3, wherein the first and the second attachment group comprise:
a support body, intended for attachment to the frame of the bicycle or to the chain guide, said chain tensioning spring being constrained at a second end thereof to said support body, said rotary body with said toothed sector being associated with one from the first and the second attachment group, free to rotate with respect to said support body.

5. Bicycle gearshift according to claim 2, wherein said kinematic mechanism for adjusting the preload adjusts the preload of said first chain tensioning spring.

6. Bicycle gearshift according to claim 2, wherein said kinematic mechanism for adjusting the preload adjusts the preload of said second chain tensioning spring.

7. Bicycle gearshift according to claim 3, wherein said pinion is mounted in a fixedly connected manner on a pin element of said four pin elements, said pin element being fixedly connected to one of said connecting rods.

8. Bicycle gearshift according to claim 3, wherein said pinion is mounted in a fixedly connected manner on an actuation pin substantially parallel to said pin elements, said actuation pin being set in rotation by said gearshift actuation means.

9. Bicycle gearshift according to claim 1, wherein said gearshift actuation means are of the mechanical type and comprise:
- a sheath seat for supporting a control cable comprising an outer sheath relative to which an inner cable core is free to slide, said sheath seat fixing said outer sheath in position in order to allow said inner core to slide;
- a retaining clip of an end of said inner core, said sheath seat and said clip being arranged substantially at pin elements that are diagonally opposite in said four-bar linkage-kinematic mechanism;
- a return spring arranged at one of said pin elements, to deform said four-bar linkage-kinematic mechanism in contrast to the traction imposed by a relative translation between said outer sheath and said inner core of said control cable.

10. Bicycle gearshift according to claim 1, wherein said gearshift actuation means are of the motorised type and comprise a motor that drives the displacement of a shaft along a diagonal of said four-bar linkage-kinematic mechanism.

11. Bicycle gearshift according to claim 10, wherein said motor is supported inside said four-bar linkage-kinematic mechanism through a support shell constrained in a tilting manner at a first pin element of said four pin elements, said shaft acting on a pin element of said four pin elements opposite said first pin element.

12. Bicycle gearshift according to claim 8, wherein said gearshift actuation means are of the motorised type and comprise a motor that drives the displacement of a shaft along a diagonal of said four-bar linkage-kinematic mechanism, and said motor has an outlet axis perpendicular to said shaft, said motor commanding a rotation of said actuation pin, said actuation pin carrying a toothed spindle rotating as a unit with it in shape coupling with a rack formed on said shaft in order to determine a displacement in translation of said shaft.

13. Bicycle gearshift according to claim 12, wherein said rack is guided in translation inside a tubular portion of un guide shell idly mounted on said actuation pin, said guide shell enclosing said toothed spindle in order to keep said shape coupling between said toothed spindle and said rack.

14. Bicycle gearshift according to claim 4, wherein said first attachment group comprises a pair of clamping screws arranged coaxially so as to be able to slide one inside the other and a locking element that is able to rotate with respect to said clamping screws, said locking element being provided with a stop tooth suitable for limiting the rotation thereof with respect to said frame, said first chain tensioning spring engaging at said second end thereof in a hole of said locking element, said clamping screws and said locking element acting as said support body of said first chain tensioning spring.

15. Bicycle gearshift according to claim 4, wherein said second attachment group comprises a fifth pin element connected, at a second end, in a fixedly connected manner to said chain guide and provided, at a first end, opposite the second end, with a connection interface to said mobile body, said fifth pin element acting as said support body of said second chain tensioning spring.

16. Bicycle gearshift according to claim 1, wherein said kinematic mechanism for adjusting the preload of at least one chain tensioning spring comprises a rotary body with which said chain tensioning spring engages at a first end thereof so that a rotation of said rotary body determines a variation in preload of said chain tensioning spring, said rotary body being set in rotation by said gearshift actuation means.

* * * * *